United States Patent
Murakami et al.

(10) Patent No.: US 8,957,591 B2
(45) Date of Patent: Feb. 17, 2015

(54) ILLUMINATION SYSTEM

(75) Inventors: Yoshinobu Murakami, Osaka (JP); Koji Nakagawara, Osaka (JP); Masahito Ohnishi, Hyogo (JP); Masahiro Naruo, Osaka (JP); Shigeru Ido, Osaka (JP); Kazuhiro Nisimoto, Osaka (JP); Hiromitsu Mizukawa, Osaka (JP)

(73) Assignee: Panasonic Corporation, Osaka (JP)

( * ) Notice: Subject to any disclaimer, the term of this patent is extended or adjusted under 35 U.S.C. 154(b) by 102 days.

(21) Appl. No.: 13/405,460

(22) Filed: Feb. 27, 2012

(65) Prior Publication Data

US 2012/0223651 A1 Sep. 6, 2012

(30) Foreign Application Priority Data

Mar. 4, 2011 (JP) .................................. 2011-048007

(51) Int. Cl.
H05B 37/02 (2006.01)
H05B 33/08 (2006.01)

(52) U.S. Cl.
CPC ........ H05B 33/0845 (2013.01); H05B 33/0815 (2013.01); H05B 33/0818 (2013.01); Y02B 20/383 (2013.01)
USPC ................... 315/224; 315/185 R; 315/200 R; 315/225; 315/291

(58) Field of Classification Search
USPC .......... 315/185 R, 194, 200 R, 224, 225, 291, 315/307
See application file for complete search history.

(56) References Cited

U.S. PATENT DOCUMENTS

| 5,268,631 | A | 12/1993 | Gorman et al. |
| 8,427,070 | B2 | 4/2013 | Matsuda |
| 2010/0225251 | A1 | 9/2010 | Maruyama |
| 2011/0043121 | A1 | 2/2011 | Matsuda et al. |
| 2011/0121744 | A1* | 5/2011 | Salvestrini et al. ........... 315/246 |
| 2012/0033471 | A1* | 2/2012 | Newman, Jr. ................. 363/126 |

(Continued)

FOREIGN PATENT DOCUMENTS

| CN | 101646288 A | 2/2010 |
| CN | 101827477 A | 9/2010 |

(Continued)

OTHER PUBLICATIONS

Office Action dated Dec. 4, 2013 in correspondence with Chinese application No. 2012 1004 8284.2.

(Continued)

*Primary Examiner* — Douglas W Owens
*Assistant Examiner* — Thai Pham
(74) *Attorney, Agent, or Firm* — Bacon & Thomas, PLLC

(57) ABSTRACT

An illumination system includes a lighting apparatus having a solid-state light emitting element as a light source; and a dimmer including a bidirectional switching element having a self-sustaining function and connected to a serial circuit of the lighting apparatus and an external power source. The dimmer varies a conduction angle of the bidirectional switching element by controlling a phase of an AC voltage of the external power source, wherein the lighting apparatus performs dimming of the light source based on the conduction angle of the bidirectional switching element, and the dimmer continues to apply driving current to the bidirectional switching element during a first period, which is a part of a second period, the bidirectional switching element being allowed to conduct throughout the second period.

11 Claims, 8 Drawing Sheets

(56) References Cited

U.S. PATENT DOCUMENTS

| | | | |
|---|---|---|---|
| 2012/0098457 A1* | 4/2012 | Radermacher | 315/291 |
| 2012/0139431 A1* | 6/2012 | Thompson et al. | 315/200 R |
| 2013/0162155 A1 | 6/2013 | Matsuda et al. | |

FOREIGN PATENT DOCUMENTS

| | | | |
|---|---|---|---|
| EP | 2 288 237 A2 | 2/2011 | |
| JP | 5-66718 A | 3/1993 | |
| JP | 2006-236709 A | 9/2006 | |
| JP | 2010-118229 A | 5/2010 | |
| JP | 2010-192266 A | 9/2010 | |
| JP | 2012-014953 A | 1/2012 | |

OTHER PUBLICATIONS

European Search Report dated Apr. 14, 2014 issued in corresponding European application No. 12001312.3.

* cited by examiner

US 8,957,591 B2

ILLUMINATION SYSTEM

FIELD OF THE INVENTION

The present invention relates to an illumination system which performs dimming control of a light source by phase control.

BACKGROUND OF THE INVENTION

There has been known an illumination system wherein an AC power source is connected to a triac, which is a bidirectional triode thyristor and performs on/off control of the AC power source. In the illumination system, a light emitting diode (LED) lamp is on and off controlled by the on/off control of the triac (see, e.g., Japanese Patent Application Publication No. H05-066718). The above-described example includes a diode bridge circuit which rectifies the AC power from the triac performing the on/off control of an AC power source to thereby provide the DC power which serves to light the LED lamp.

The triac has a "self-sustaining function". That is, once triggered, the triac continues to conduct until the current therethrough falls below a so-called holding current.

When performing the on/off control of the above-mentioned triac, a so-called pulse trigger method is normally employed in which a pulse is inputted to a gate terminal of the triac only when the triac is switched to a conducting state. In this pulse trigger method, however, the current flowing through the triac may drop below the holding current due to a noise overlapped on a power line of a commercial power source and thus the triac may be suddenly switched to a non-conducting state (turned off). Further, a repetition of this phenomenon may cause flickering during lighting a lighting load. Especially, when an LED is employed as the lighting load and is dimmed as in the foregoing conventional example, a noise may be easily overlapped on the power line of the commercial power source as compared to when an incandescent bulb is used as the lighting load, and thus the above-mentioned problem may easily occur.

SUMMARY OF THE INVENTION

In view of the above, the present invention provides an illumination system which can perform stabilized dimming control of an LED lighting load with less flickering due to a noise overlapped on a power line during lighting.

In accordance with an embodiment of the present invention, there is provided an illumination system that includes a lighting apparatus having a solid-state light emitting element as a light source; and a dimmer including a bidirectional switching element having a self-sustaining function and connected to a serial circuit of the lighting apparatus and an external power source, wherein the dimmer varies a conduction angle of the bidirectional switching element by controlling a phase of an AC voltage of the external power source, wherein the lighting apparatus performs dimming of the light source based on the conduction angle of the bidirectional switching element, and the dimmer continues to apply driving current to the bidirectional switching element during a first period, which is a part of a second period, the bidirectional switching element being allowed to conduct throughout the second period.

Preferably, the length of the first period varies depending on the length of the second period.

Preferably, the length of the first period becomes longer as the length of the second period becomes longer.

Preferably, the lighting apparatus detects the conduction angle of the bidirectional switching element within the first period in which the dimmer continues to apply the driving current to the bidirectional switching element.

Preferably, if the conduction angle of the bidirectional switching element is below a predetermined value, dimming of the light source is performed at a constant dimming ratio regardless of the conduction angle and wherein, at the constant dimming ratio, the light source is turned on at a certain brightness level.

Preferably, a holding circuit is connected in parallel with the lighting apparatus and provides a path for flowing current to the dimmer from the external power source during a period in which no driving current is applied to the bidirectional switching element.

BRIEF DESCRIPTION OF THE DRAWINGS

The objects and features of the present invention will become apparent from the following description of embodiments, given in conjunction with the accompanying drawings, in which:

FIGS. 1A and 1B are views illustrating an illumination system in accordance with a first embodiment of the present invention, in which FIG. 1A is a schematic view of the illumination system and FIG. 1B are waveform diagrams for explaining an operation of the illumination system;

FIGS. 3A to 3C are views explaining problems of a dimming operation, in which FIG. 3A is an explanatory view of a conduction angle of a triac (without suffering from a noise), FIG. 3B is an explanatory view of the conduction angle of the triac when a noise is overlapped on a commercial power source, and FIG. 3O is a view showing the relationship between the dimming ratio of a light source unit and the conduction angle;

FIGS. 4A to 4D are views illustrating an illumination system in accordance with a second embodiment of the present invention, in which FIG. 4A is an explanatory view of a conduction angle of a triac at an upper dimming limit, FIG. 4B is an explanatory view of the conduction angle of the triac at a lower dimming limit, FIG. 4C is a view showing the correlation between the dimming ratio of a light source unit and the conduction angle, and FIG. 4D is a view showing the relationship between the dimming ratio of a light source unit and the conduction angle in another configuration of the lighting apparatus;

FIGS. 5A to 5C are views illustrating an illumination system in accordance with a third embodiment of the present invention, in which FIG. 5A is a schematic view of the illumination system, FIG. 5B is a circuit diagram of a first holding circuit, and FIG. 5C is a waveform diagram showing the relationship between a trigger signal and a current flowing through the first holding circuit;

FIGS. 7A and 7B are views for explaining still another configuration of the illumination system, in which FIG. 7A is a circuit diagram of a second holding circuit and FIG. 7B is a waveform diagram showing the relationship between a trigger signal and a current flowing through the second holding circuit.

DETAILED DESCRIPTION OF THE EMBODIMENTS

Figure 1A:
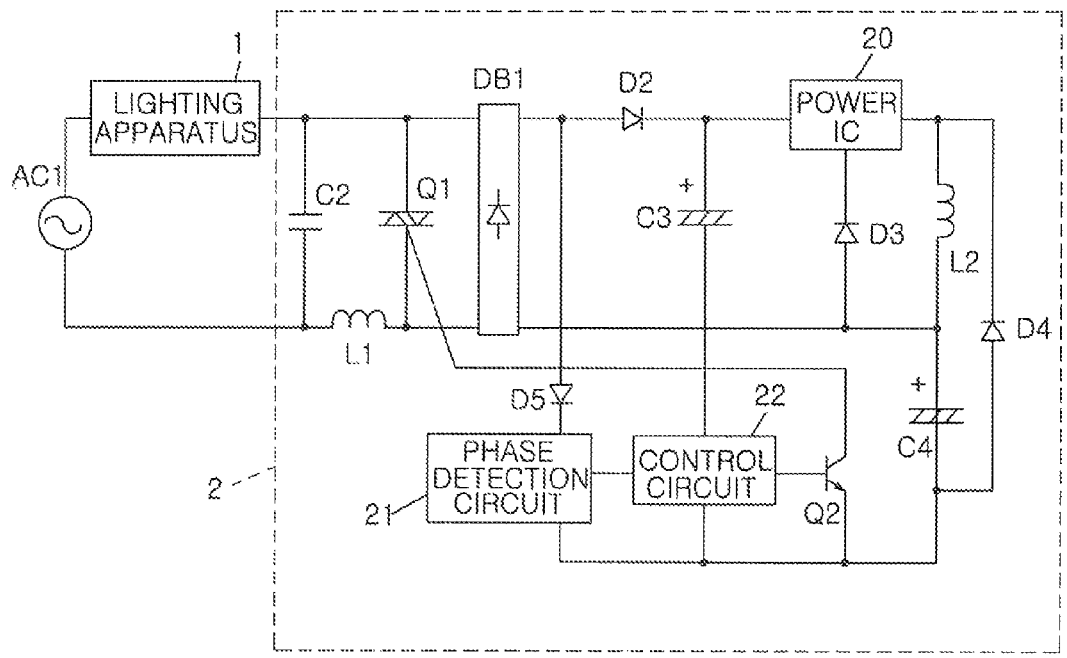

Hereinafter, embodiments of the present invention will be described in more detail with reference to the accompanying drawings that constitute a part of the present invention. In the drawings, same reference numerals are used for the same or like parts and a repeated description thereof will be omitted.

(Embodiment 1)

Hereinafter, an illumination system in accordance with a first embodiment of the present invention will be described with reference to FIGS. 1A to 2. In this embodiment, as shown in FIG. 1A, the illumination system includes a lighting apparatus 1 having a light source unit 10 (see FIG. 2) that is lighted by an AC power supplied from a commercial power source (external power source) AC1 and a dimmer 2 which changes effective power supplied to the lighting apparatus 1 by phase control.

Figure 2:
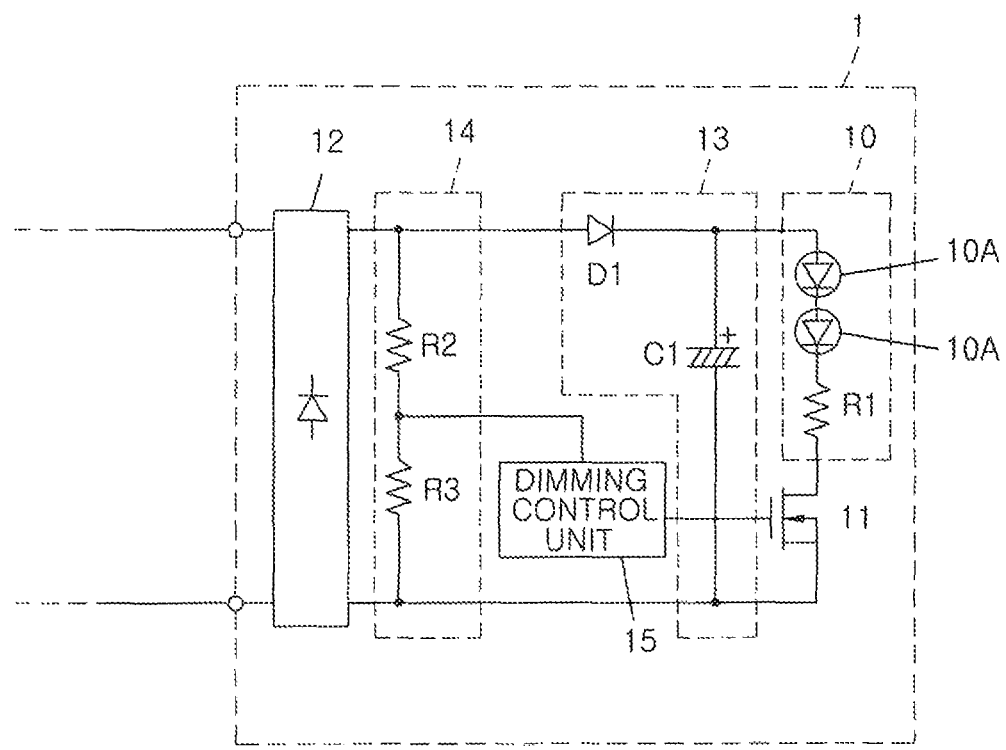
FIG. 2 is a schematic view of a lighting apparatus of the illumination system.

As shown in FIG. 2, the lighting apparatus 1 includes, e.g., the light source unit 10 having multiple LEDs 10A, which are solid-state light emitting elements connected in series, and a resistor R1 for current limitation; and a dimming switch unit 11 serially connected to the light source unit 10 to turn on and off power feeding to the light source unit 10. Further, the lighting apparatus 1 includes a rectification unit 12 for rectifying an AC voltage supplied from the commercial power source AC1; a smoothing unit 13 for smoothing an output from the rectification unit and outputting it to the light source unit 10; and a voltage detection unit 14 for detecting the output voltage from the rectification unit 12.

In addition, the lighting apparatus 1 includes a dimming control unit 15 which dims the light source unit 10, e.g., by determining a conduction angle based on a voltage detection period of the voltage detection unit 14 and switching the on/off of the dimming switch unit 11 by a duty ratio determined based on the conduction angle.

The rectification unit 12 is configured as a diode bridge which full-wave rectifies the AC voltage supplied from the commercial power source AC1. The smoothing unit 13 includes a diode D1 and a smoothing capacitor C1 connected between the output terminals of the rectification unit 12 via the diode D1. The voltage detection unit 14 includes a serial circuit of resistors R2 and R3 connected between the output terminals of the rectification unit 12. Thus, in the voltage detection unit 14, the output voltage from the rectification unit 12 is divided by the resistors R2 and R3, and the dimming control unit 15 detects the conduction angle based on the potential at the connection point of the resistors R2 and R3.

As shown in FIG. 1A, the dimmer 2 includes a capacitor C2 and an inductor L1, which are connected to input terminals and constitute a filter for a noise filtering, and a triac Q1 which is a bidirectional switching element having the self-sustaining function. When the triac Q1 is in a conducting state (turned-on state), an AC power is supplied from the commercial power source AC1 to the lighting apparatus 1. Further, the dimmer 2 includes a diode bridge DB1 for rectifying the AC voltage supplied from the commercial power source AC1, a smoothing capacitor C3 for smoothing an output from the diode bridge DB1 through the diode D2, and a power IC 20 for converting an output voltage from the smoothing capacitor C3 into a constant voltage. The power IC 20 is a switching power source and a diode D3 is connected to a ground terminal thereof.

A closed circuit including an inductor L2, a capacitor C4, and a diode D4 is connected to an output terminal of the power IC 20. The closed circuit serves to charge the capacitor C4 with a flyback current flowing through the inductor L2 and set the potential of the gate terminal of the triac Q1 to be lower than the potentials of two main terminals of the triac Q1. That is, the capacitor C4 serves as a control power source required to control the conducting/non-conducting state of the triac Q1.

Figure 1B:
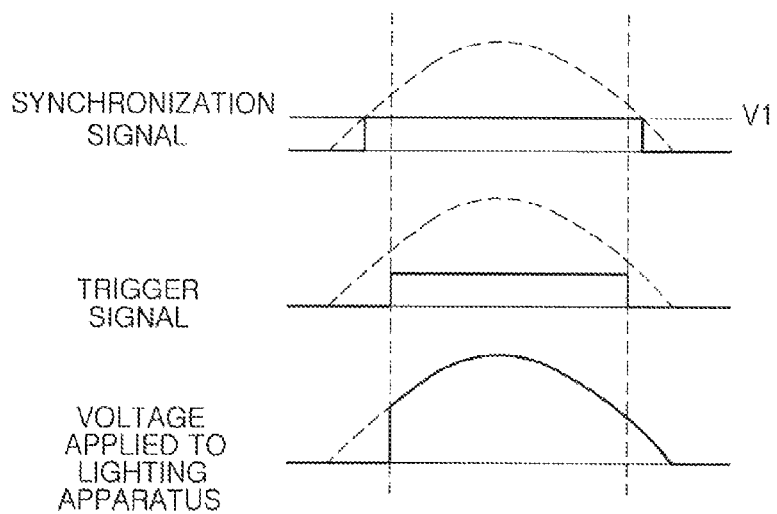

A phase detection circuit 21 is connected to an output terminal of the diode bridge DB1 via a diode D5. The phase detection circuit 21 generates a synchronization signal based on a phase of an AC voltage supplied from the commercial power source AC1, and outputs same to a control circuit 22 to be described later. In this embodiment as shown in FIG. 1B, the phase detection circuit 21 compares a power voltage of the commercial power source AC1 with a predetermined voltage V1 by detecting the output voltage from the diode bridge DB1, and generates the synchronization signal during a period in which the power voltage of the commercial power source AC1 is equal to or greater than the voltage V1. That is, the synchronization signal rises when the power voltage of the commercial power source AC1 becomes equal to or greater than the predetermined voltage V1, and falls when it is below the voltage V1. Further, the broken lines in FIG. 1B indicate the power voltage of the commercial power source AC1.

A switching element Q2 is connected to the gate terminal of the triac Q1. The switching element Q2 is an npn-type transistor. The gate terminal of the triac Q1 is connected to the collector terminal of the switching element Q2. Further, the capacitor C4 is connected to the emitter terminal of the switching element Q2, and the base terminal thereof is connected the control circuit 22.

The control circuit 22 generates a trigger signal for switching on and off the switching element Q2 based on the synchronization signal applied from the phase detection circuit 21 and a dimming signal applied from an operation unit (not shown) of the dimmer 2 (see FIG. 1B). The rising and falling of the trigger signal are all determined based on the rising edge of the synchronization signal. The trigger signal is inputted to the base terminal of the switching element Q2. The switching element Q2 is switched to an ON state when the trigger signal is at a high level, and current flows to the gate terminal of the triac Q1 as the potential of the gate terminal of the triac Q1 is lower than the potentials of the two main terminals thereof, and hence the triac Q1 goes into the conducting state.

Hereinafter, the operation of the illumination system of this embodiment will be described. First, the phase detection circuit 21 detects the output voltage of the diode bridge DB1 to generate the synchronization signal, and outputs same to the control circuit 22. The control circuit generates the trigger signal based on the applied synchronization signal, and outputs same to the base terminal of the switching element Q2. Thus, the switching element Q2 is switched to the ON state along with the rise of the trigger signal, and the triac Q1 goes into the conducting state (is turned on). Accordingly, as shown in FIG. 1B, the power voltage of the commercial power source AC1 is applied to the lighting apparatus 1.

Further, a phase angle of a rising edge of the trigger signal is changed by a voltage signal (dimming signal) sent from the operation unit of the dimmer 2. Accordingly, the conduction period of the power voltage applied to the lighting apparatus 2 is changed, thus enabling dimming.

Thereafter, when the trigger signal falls, the switching element Q2 is switched to an OFF state, thus preventing current from flowing through the gate terminal of the triac Q1. As the triac Q1 maintains the conducting state while a current not less than the holding current continues to flow, the power voltage of the commercial power source AC1 continues to be applied to the lighting apparatus 1 for a while even after the fall of the trigger signal (see FIG. 1B). Thereafter, when the power voltage of the commercial power source AC1 reaches a zero-cross point, the current flowing through the triac Q1 drops below the holding current, and thus the triac Q1 is switched to a non-conducting state. Accordingly, the application of the power voltage of the commercial power source AC1 to the lighting apparatus 1 is stopped.

In the lighting apparatus 1, the dimming control unit detects the conduction angle based on the voltage detection period of the voltage detection unit 14. Further, the dimming control unit 15 dims the light source unit 10 by switching on and off the dimming switch unit 11 by a duty ratio determined based on the detected conduction angle. Here, unlike the conventional pulse trigger signal, the trigger signal of the present invention continues to be at a high level during a certain portion of the period during which a main power is applied to the lighting apparatus 1, as shown in FIG. 1B. Accordingly, the switching element Q2 maintains the ON state until the trigger signal falls, and therefore current continues to flow through the gate terminal of the triac Q1. That is, driving current continues to be applied to the triac Q1 during a certain portion (ON period of the trigger signal) of the period during which the triac Q1 is conducted. Due to this, even if a noise overlaps on the power line of the commercial power line AC1, the a noise does not cause the triac Q1 to be suddenly switched to the non-conducting state, thereby stably applying the power voltage of the commercial power source AC1 to the lighting apparatus 1.

Specifically, in the conventional pulse trigger control, a trigger pulse of a fixed brief duration is applied to, the triac, which then commences to conduct and maintain the conducting state until the zero cross point. In the present embodiment, however, the duration of the trigger signal is much longer than that of the conventional trigger pulse. In one example, the duration of the trigger signal varies depending on the length of the intended conducting state of the triac. In another example, the duration of the trigger signal is set to be longer to render longer the duration for which the triac maintains in the conducting state.

As described above, in this embodiment, driving current continues to be applied to the triac Q1 during the ON period of the trigger signal. Due to this, when a lighting load using the LED 10A is under dimming control, stabilized lighting with less flickering can be performed regardless of a noise overlapping on the power line of the commercial power line AC1.

In addition, in the dimming method of the lighting apparatus 1 of this embodiment, the light source unit 10 is dimmed by switching on and off the dimming switch unit 11. However, same effect can also be obtained by a circuit configuration in which dimming is performed by varying the current flowing through the light source unit 10.

Further, in this embodiment, the LED 10A is used as a light source. However, the present invention is not limited thereto, and a solid-state light emitting device other than the LED may be used as the light source. Additionally, the LEDs 10A may be connected in parallel, or parallelly connected multiple sets of LEDs, each set being connected in series as shown in FIG. 2, may be used in lieu of the light source unit 10. Further, the resistor R1 in the light source unit 10 may be omitted.

(Embodiment 2)

Hereinafter, an illumination system in accordance with a second embodiment of the present invention will be described with reference to FIGS. 3A to 4D. The basic configuration of this embodiment is the same as that of the first embodiment, thus a description of the common parts will be omitted.

In the first embodiment, the problem of a noise overlapping on the power line of the commercial power source AC1 was solved by continuously applying driving current to the triac Q1 during the ON period of the trigger signal. However, the following problem may occur during a period (OFF period of the trigger signal) in which no driving current is applied to the triac Q1.

Figure 3A:
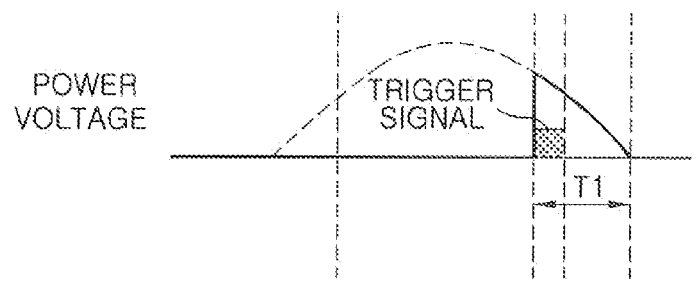

First, as shown in FIG. 3A, at normal time when there is no noise overlapping on the power line of the commercial power source AC1, the triac Q1 maintains the conducting state during the OFF state of the trigger signal until the current flowing through the triac Q1 drops below a certain threshold (the so-called holding current). In FIG. 3A, the broken line indicates the power voltage of the commercial power source AC1. If the dimming control unit 15 of the lighting apparatus 1 detects, as the conduction angle, a voltage detection period during which the voltage detection unit 14 detects the voltage (i.e., a period during which a detected voltage is greater than 0 V), the conduction angle of the triac Q1 is represented by a period T1 persisting from rising of the trigger signal until the current flowing through the triac Q1 drops below the holding current (i.e., the power voltage of the commercial power source AC1 reaches a zero-cross point).

Figure 3B:
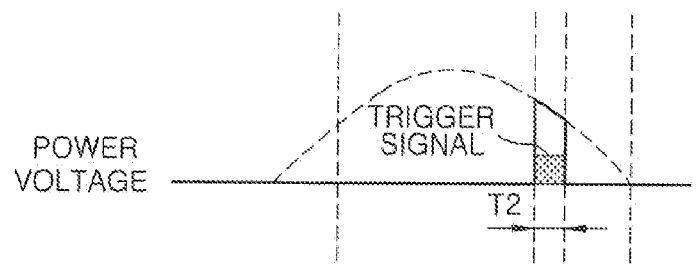
Figure 3C:
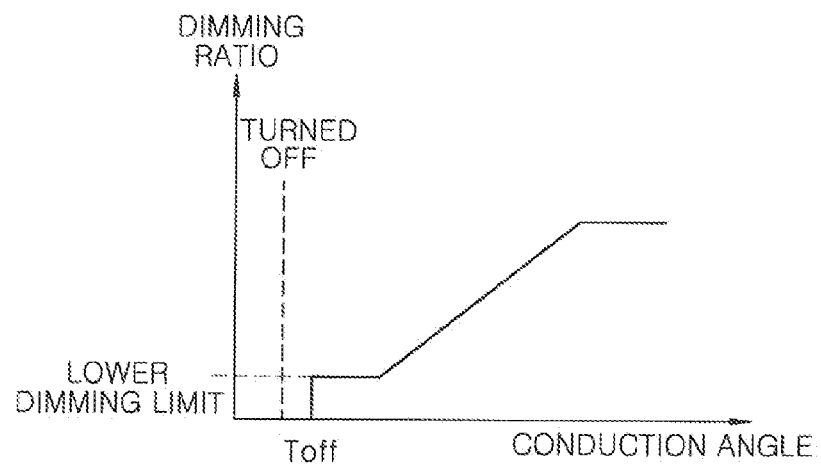

In such a case, however, the current flowing through the triac Q1 may drop below the holding current in the OFF period of the trigger signal if a noise is overlapped on the power line of the commercial power source AC1 during the OFF period. The triac Q1 then goes into the non-conducting state, and thus the power voltage of the commercial power source AC1 is not applied to the lighting apparatus 1. In this case, the conduction angle of the triac Q1 may become a period T2 shorter than the period T1 (T2<T1) as shown in FIG. 3B. In FIG. 3B, the broken line indicates the power voltage of the commercial power source AC1. Thus, if a noise overlaps on the power line of the commercial power source AC1, the conduction angle may be changed to cause flickering during lighting the lighting apparatus 1. In addition, as shown in FIG. 3C, if the conduction angle drops below the minimum conduction angle Toff, the lighting apparatus 1 may be suddenly turned off. Here, when the conduction angle is below Toff, the dimming ratio becomes 0 and the lighting apparatus 1 is turned off.

In view of the above, the lighting apparatus 1 of this embodiment detects the conduction angle of the triac Q1 within the period in which the dimmer 2 continues to apply driving current to the triac Q1. That is, the dimming control unit 15 detects the conduction angle during a period in which the power voltage of the commercial power source AC1 is above a predetermined voltage value V2. Here, the predetermined voltage value V2 is set to be not less than the power voltage value of the commercial power source AC1 at a falling edge of the trigger signal.

Figure 4A:
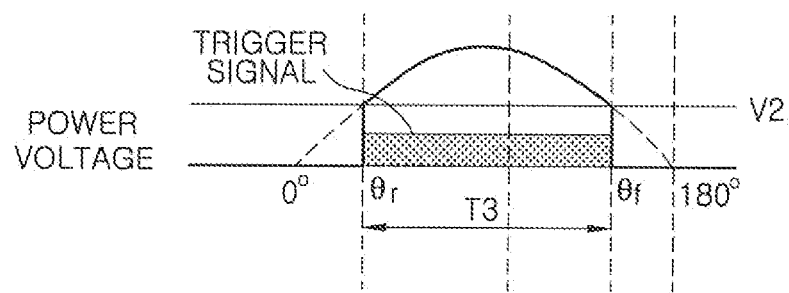
Figure 4B:
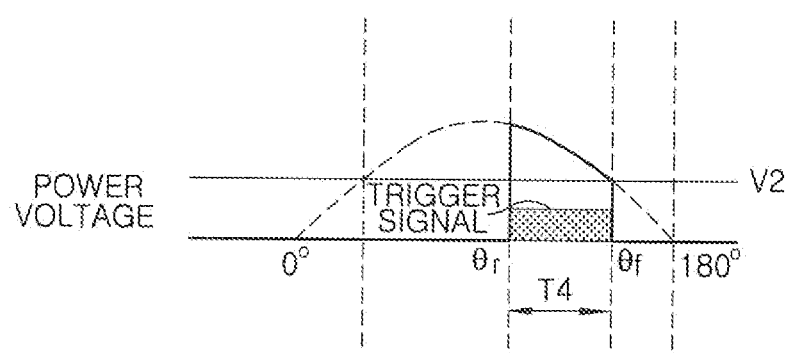
Figure 4C:
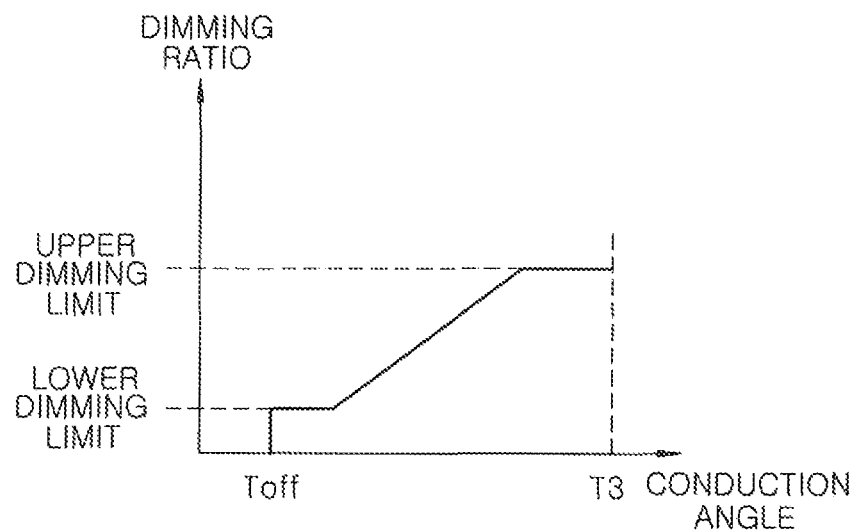

In the examples shown in FIGS. 4A and 4B, it is assumed that the power voltage of the commercial power source AC1 is V2 at the falling edge of the trigger signal, and the power voltage value of the commercial power source AC1 at the rising edge is not less than V2. In such a case, if the maximum value of the ON period of the trigger signal is T3, the maximum value of the conduction angle is also T3, and, if the minimum value of the ON period of the trigger signal is T4, the minimum value of the conduction angle is also T4.

In the examples shown in FIGS. 4A and 4B, the phase angle θr at the rising edge of the trigger signal becomes smaller as the dimming level inputted through the operation unit of the dimmer 2 becomes higher (brighter). On the other hand, the phase angle θf at the falling edge of the trigger signal has a fixed value regardless of the dimming level. Further, the minimum phase angle θr (mim.) corresponds to the maximum ON period of the trigger angle T3≤(180°−θf). As described in the first embodiment, the duration of the trigger signal (θf−θr) is set to be longer as the duration of the intended conducting state (the intended ON period (180°−θf)) of the triac becomes longer. During the intended ON state of the triac, the triac can remain turned on if there is no noise.

As described above, in this embodiment, a period in which the power voltage of the commercial power source AC1 is below is not included in the conduction angle detected by the dimming control unit 15. Therefore, even if a noise overlaps on the power line of the commercial power source AC1 in that period, the conduction angle is not changed. Accordingly, in this embodiment, stabilized dimming can be performed even if a noise overlaps on the power line of the commercial power source AC1.

Figure 4D:
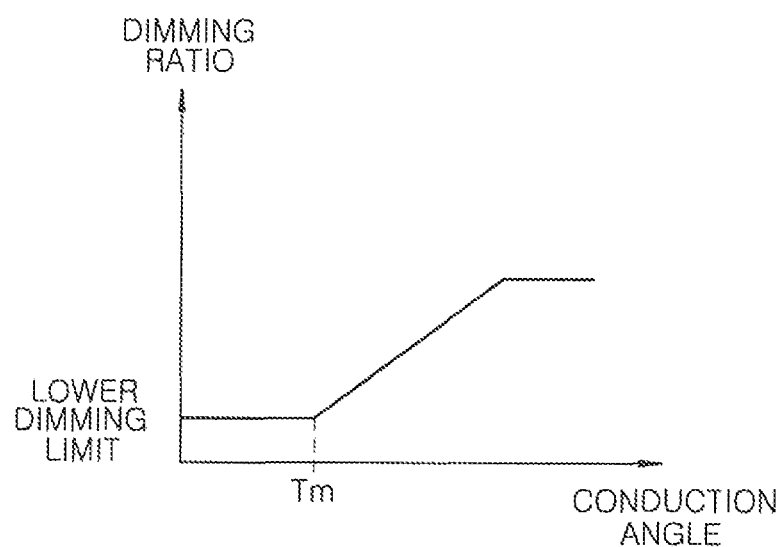

Further, while, e.g., detecting the conduction angle in a manner described with reference to FIGS. 3A and 3B, (i.e., not detecting the conduction angle by excluding the period in which the power voltage of the commercial power source AC1 is below V2), the dimming control unit 15 may dim, as shown in FIG. 4D, the light source unit 10 at a minimum dimming ratio regardless of the conduction angle if the conduction angle is below the period Tm. In this case also, stabilized lighting can be performed without flickering even if a noise overlaps on the power line of the commercial power source AC1.

The period Tm may be set as 180°−θf. At the minimum dimming ratio, the lighting apparatus 1 maintains a certain non-zero brightness level without being turned off and the lighting apparatus 1 is turned on at the minimum dimming ratio even the conduction angle drops zero.

(Embodiment 3)

Hereinafter, an illumination system in accordance with a third embodiment of the present invention will be described with reference to FIGS. 5A to 7C. The basic configuration of this embodiment is the same as that of the first embodiment, Thus, a description of the common parts will be omitted. As explained in the second embodiment, the triac Q1 may suddenly go into the non-conducting state due to a noise overlapping on the power line of the commercial power source AC1 in the OFF period of the trigger signal, and there is a possibility that flickering may occur when lighting the lighting apparatus 1. In this embodiment, therefore, a first holding circuit 3 is provided in parallel with the lighting apparatus 1 and in series with the dimmer 2 as shown,in FIG. 5A, so that sufficient current continues to flow through the triac Q1 even in the OFF period of the trigger signal.

Figure 5A:
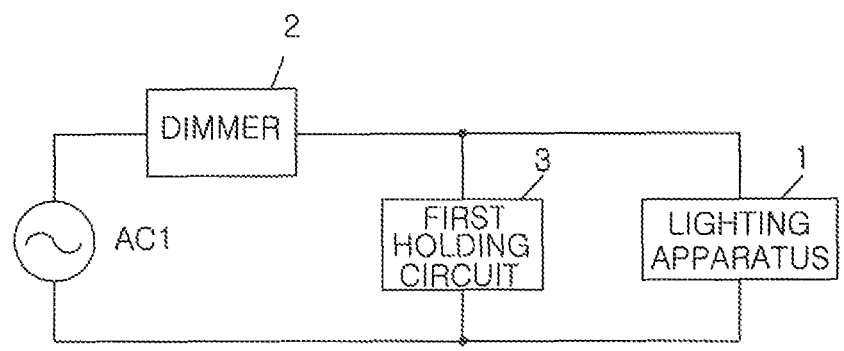
Figure 5B:
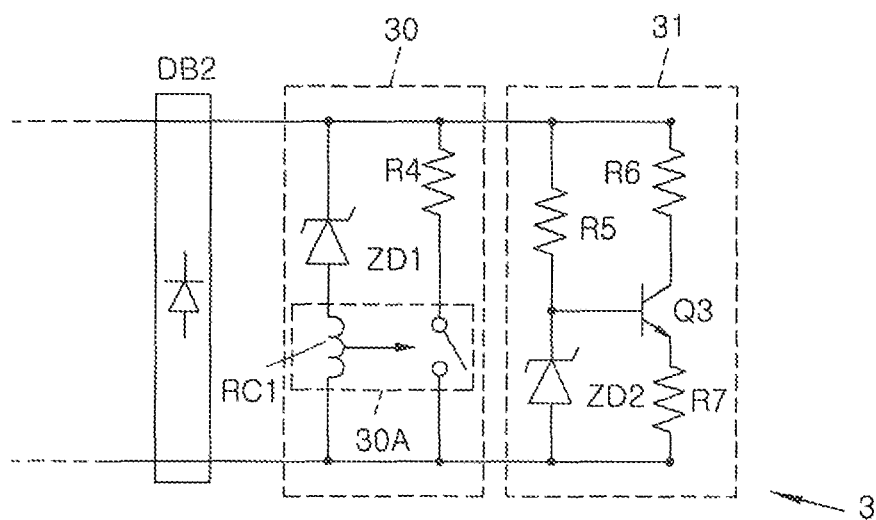

As shown in FIG. 5B, the first holding circuit 3 includes a diode bridge DB2 and a parallel circuit of a charging circuit 30 for the dimmer 2 and a constant current circuit 31. The diode bridge DB2 performs full-wave rectification of the power voltage supplied from the commercial power source AC1 and the charging circuit 30 and the constant current circuit 31 are connected to the output terminals of the diode bridge DB2.

In the charging circuit 30, a serial circuit of a resistor R4 and a normally closed contact type relay 30A is provided, and a Zener diode ZD1 is connected in series with a relay coil RC1 of the relay 30A. Therefore, when the power voltage of the commercial power source AC1 applied to the first holding circuit 3 is below a breakdown voltage of the Zener diode ZD1, the relay coil RC1 is not conducted, and thus the relay 30A is remains closed. Further, when the power voltage of the commercial power source AC1 applied to the first holding circuit 3 is equal to or greater than the breakdown voltage of the Zener diode ZD1, the relay coil RC1 is conducted, and thus the relay 30A is opened. In this embodiment, the breakdown voltage of the Zener diode ZD1 may be preferably set as the above-described voltage V2.

The constant current circuit 31 is configured by connecting in parallel a serial circuit of a resistor R5 and a Zener diode ZD2 with a serial circuit of a resistor R6, a switching element Q3, and a resistor R7. The switching element Q3 is an npn-type transistor, and a voltage developed between two ends of the Zener diode ZD2 is applied to a base terminal of the switching element Q3. Accordingly, current flows through the switching element Q3 so that the sum of the base-emitter voltage of the switching element Q3 and the voltage between two ends of the resistor R7 is balanced with the voltage between two ends of the Zener diode ZD2. That is, if the power voltage of the commercial power source AC1 is equal to or greater than the breakdown voltage of the Zener diode ZD2, the switching element Q3 is turned on and the constant current additionally flows through the triac Q1. In the third embodiment, the breakdown voltage of the Zener diode ZD2 may also be set as the above-described voltage V2.

Figure 5C:
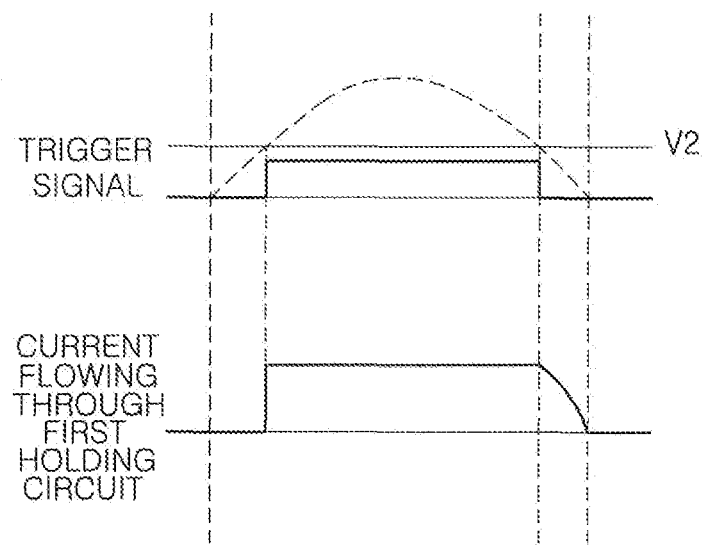

Hereinafter, the operation of the first holding circuit 3 will be described. As shown in FIG. 5C, during the period in which the trigger signal is low, i.e., the power voltage of the commercial power source AC1 is below V2, the relay 30A is closed, and the current passing through the resistor R4 flows via the dimmer 2. If the power voltage of the commercial power source AC1 is not less than V2, the relay 30A is opened to flow no current through the resistor R4, and the switching element Q3 is turned on to flow a constant current through the constant current circuit 31. Accordingly, as current flows through the first holding circuit 3 in the OFF period of the trigger signal, sufficient current continues to flow through the triac Q1. Further, in FIG. 5C, the broken line indicates the power voltage of the commercial power source AC1.

Therefore, in this embodiment, even if a noise overlaps on the power line of the commercial power line AC1, stabilized dimming can be performed. In addition, current flows through the charging circuit 30 only during the OFF period of the trigger signal in this embodiment. Thus, power consumption can be reduced as compared to the configuration in which current always flows through the charging circuit 30.

Figure 6:
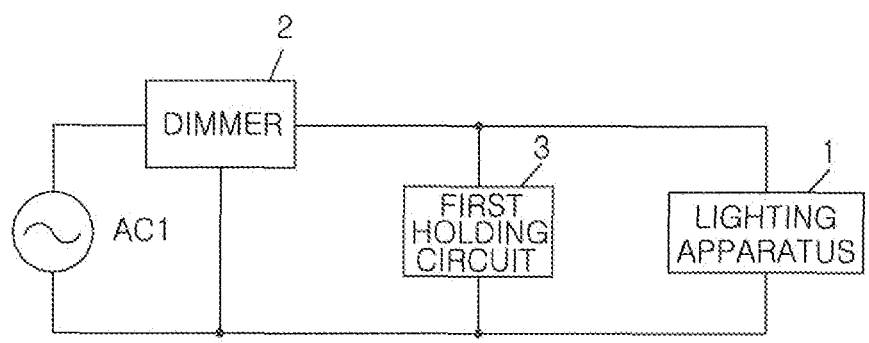
FIG. 6 is a view illustrating another example of a system configuration of the illumination system.

Further, in this embodiment, the first holding circuit 3 may be incorporated in the dimmer 2 or alternatively the first holding circuit 3 may be incorporated in the lighting apparatus 1. Also, as shown in FIG. 6, the dimmer 2 may be configured to have 3 terminals.

Figure 7A:
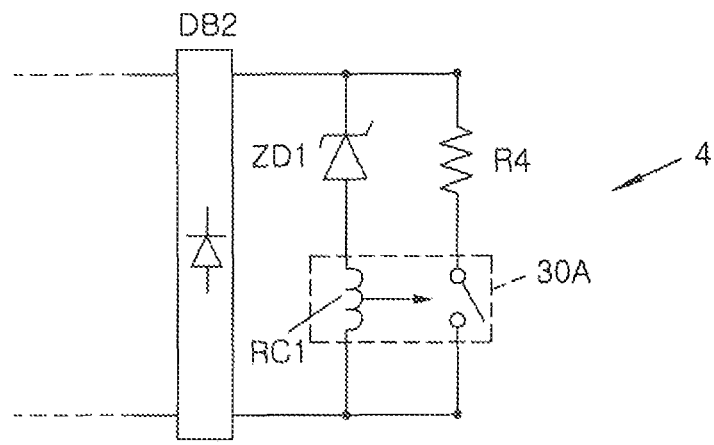

Further as shown in FIG. 7A, a second holding circuit 4 having only the diode bridge DB2 and the charging circuit 30 may be used instead of the first holding circuit 3. Accordingly, when the power voltage of the commercial power source AC1 applied to the second holding circuit 4 is not less than V2, the relay coil RC1 is conducted, and the relay 40A is opened. Further, if the power voltage of the commercial power source AC1 applied to the second holding unit 4 is below V2, the relay coil RC1 is not conducted, and thus the relay 40A is closed.

Figure 7B:
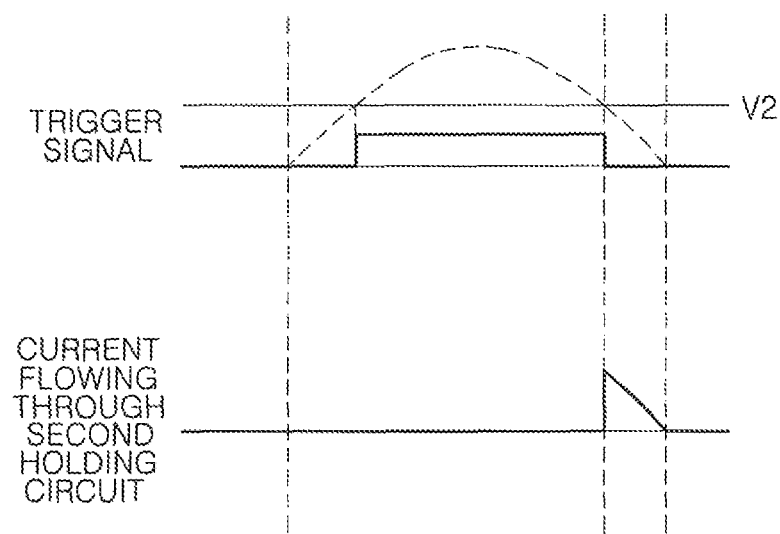

In this configuration, as shown in FIG. 7B, a path for current flowing through the dimmer 2 via the second holding circuit 4 is secured only during the period in which the power voltage of the commercial power source AC1 is below the predetermined voltage value V2. Therefore, sufficient current continues to flow through the triac Q1, and the capacitor C4, which is the control power source of the dimmer 2, is charged during the corresponding period. Also, in FIG. 7B, the broken line indicates the power voltage of the commercial power source AC1.

Furthermore, in this embodiment, while the opening and closing of the path for current flowing through the resistor R4 is performed using the relay 30A, the opening and closing thereof also may be performed using a switching element such as an FET or the like. In this case, the same effect can also be obtained. Further, the switching element Q2 may be a pnp transistor. In this case, the polarity of the trigger signal will be reversed.

In accordance with the embodiment of the present invention, when a lighting load using an LED is dimmed, the illumination system can perform stabilized lighting with less flickering regardless of a noise overlapping on a power line.

While the invention has been shown and described with respect to the embodiments, it will be understood by those skilled in the art that various changes and modifications may be made without departing from the scope of the invention as defined in the following claims.

What is claimed is:

1. An illumination system, comprising:
   a lighting apparatus having a solid-state light emitting element as a light source; and
   a dimmer including a bidirectional switching element having a self-sustaining function and connected to a serial circuit of the lighting apparatus and an external power source, wherein the dimmer varies a conduction angle of the bidirectional switching element by controlling a phase of an AC voltage of the external power source,
   wherein the lighting apparatus performs dimming of the light source based on the conduction angle of the bidirectional switching element, and the dimmer continues to apply driving current to a gate terminal of the bidirectional switching element during a first period, wherein the bidirectional switching element is allowed to conduct throughout a second period which begins at the beginning of the first period and extends for a duration longer than the first period, and
   wherein the length of the first period varies depending on the length of the second period.

2. The illumination system of claim 1, wherein the length of the first period becomes longer as the length of the second period becomes longer.

3. The illumination system of claim 1, wherein the lighting apparatus detects the conduction angle of the bidirectional switching element within the first period in which the dimmer continues to apply the driving current to the gate terminal of the bidirectional switching element.

4. The illumination system of claim 1, wherein if the conduction angle of the bidirectional switching element is below a predetermined value, dimming of the light source is performed at a constant dimming ratio regardless of the conduction angle and wherein, at the constant dimming ratio, the light source is turned on at a certain brightness level.

5. The illumination system of claim 1, wherein a holding circuit is connected in parallel with the lighting apparatus and provides a path for flowing current to the dimmer from the external power source during a period in which no driving current is applied to the gate terminal of the bidirectional switching element.

6. An illumination system, comprising:
   a lighting apparatus having a solid-state light emitting element as a light source; and
   a dimmer including a bidirectional triode thyristor connected to a serial circuit of the lighting apparatus and an external power source,
   wherein the dimmer continues to apply a driving current to a gate terminal of the bidirectional triode thyristor during a first period, wherein the bidirectional triode thyristor is allowed to conduct throughout a second period which begins at the beginning of the first period and extends for a duration longer than the first period, and
   wherein the length of the first period varies depending on the length of the second period.

7. The illumination system of claim 6, wherein the length of the first period becomes longer as the length of the second period becomes longer.

8. The illumination system of claim 6, wherein the lighting apparatus performs dimming of the light source based on the first period.

9. The illumination system of claim 6, wherein if a conduction period of the bidirectional triode thyristor is below a predetermined value, the dimmer performs dimming of the light source at a constant dimming ratio regardless of the conduction period.

10. The illumination system of claim 6, wherein a holding circuit is connected in parallel with the lighting apparatus and provides a path allowing a current to flow to the dimmer from the external power source during the remaining period of the second period excluding the first period.

11. The illumination system of claim 6, wherein the lighting apparatus performs dimming of the light source based on a conduction period of the bidirectional triode thyristor.

* * * * *